Oct. 2, 1956  B. M. MIDDLEBROOKS  2,765,066
APPARATUS FOR BLENDING ORANGES
Filed March 5, 1952  2 Sheets-Sheet 1
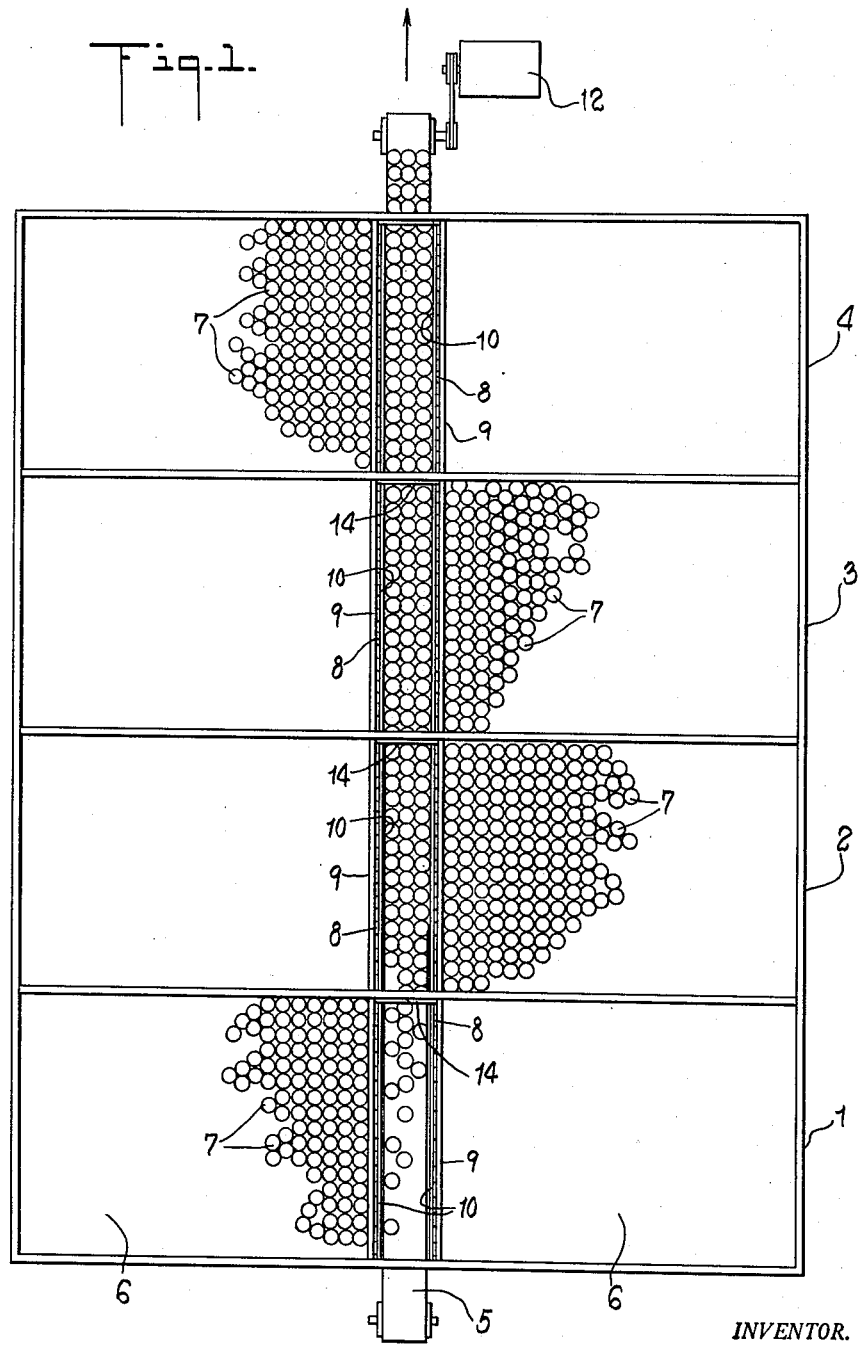
*INVENTOR.*
BILLY M. MIDDLEBROOKS
BY
Kenyon & Kenyon
ATTORNEYS

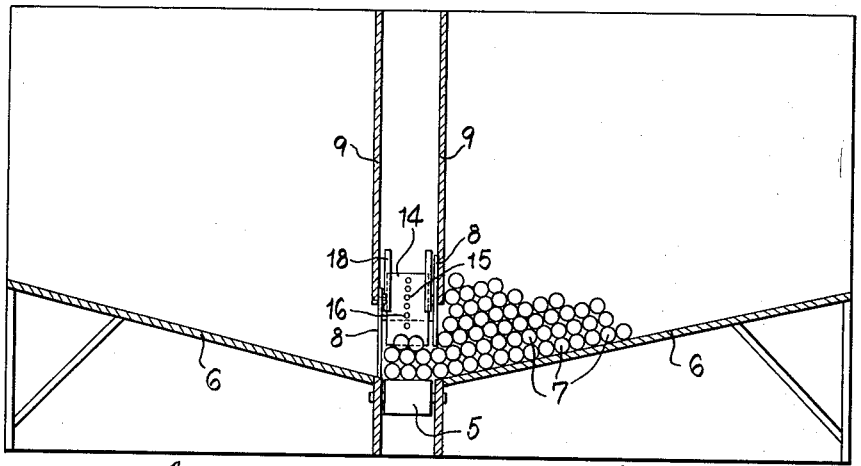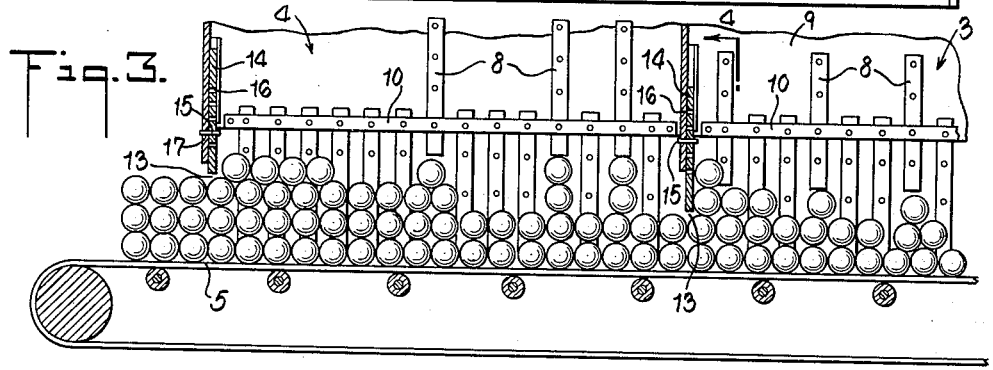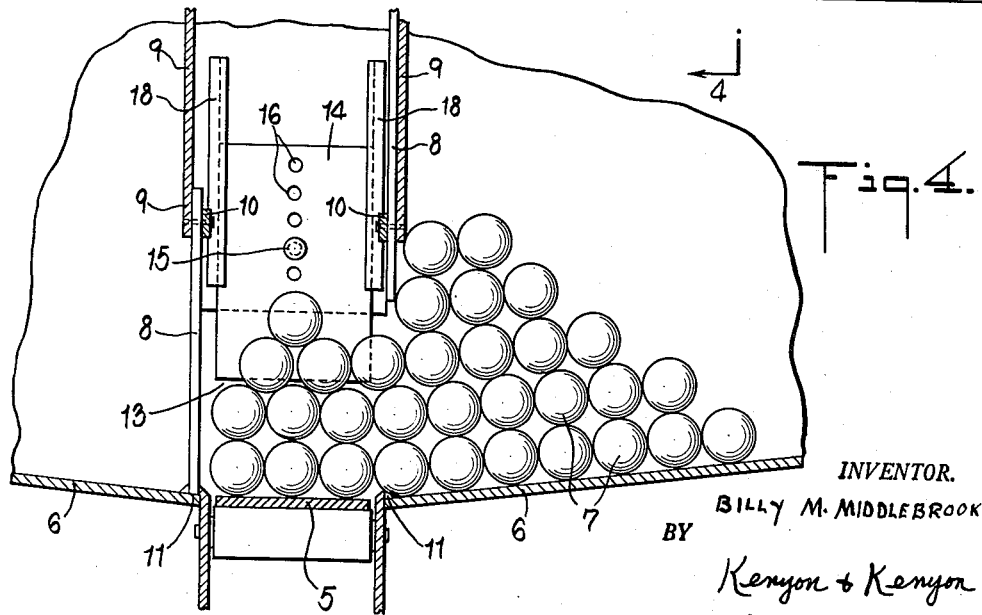

United States Patent Office 2,765,066
Patented Oct. 2, 1956

2,765,066

APPARATUS FOR BLENDING ORANGES

Billy M. Middlebrooks, Leesburg, Fla., assignor to Minute Maid Corporation, New York, N. Y., a corporation of Florida Application March 5, 1952, Serial No. 274,903

3 Claims. (Cl. 198—54)

This invention relates to apparatus for blending oranges or the like prior to extracting the juice therefrom in order to maintain desired characteristics of acidity and sweetness so that the output from a given plant will be uniform at all times.

Heretofore blending has been done in batches or by means of conveyors which are supplied with the oranges from the different groups from supply bins by gravity feed from controlled discharge openings. This type of blending requires the continuous service of trained personnel, and when it becomes necessary to vary the total quantity of blended oranges passing to the juicers, because of various plant delays, it is necessary to adjust each of the gates leading from the bins to maintain the desired blend.

The present invention overcomes these difficulties and makes it possible to continuously supply oranges blended in the desired ratio and if necessary in varying quantities.

One object of the invention is to provide apparatus which will provide a continuous quantity of blended oranges or the like in the desired ratio.

Another object is to provide such a device which is substantially automatic.

Another object is to provide such a device which is simple and economical, particularly of labor.

Other objects and advantages of the invention will be apparent from a consideration of the following specification and the drawings, in which Fig. 1 is a top plan view of an apparatus embodying the invention;

Fig. 2 is a transverse, sectional view through the apparatus showing how the apparatus blends the oranges;

Fig. 3 is a detailed longitudinal, sectional view showing the device and how it operates to blend oranges, and Fig. 4 is a detailed, sectional view taken on the line 4, 4 of Fig. 3 showing the details of the discharge openings between bins.

In general the apparatus consists of a series of bins having a belt conveyor passing therethrough. A variable speed drive is connected to the conveyor. There are openings between the bins through which the conveyor extends. These openings are provided with adjustable gates so that they may be made increasingly larger along the line of movement of the belt so that the belt can pick up from each bin the desired number of oranges from that bin.

In using the apparatus, oranges of different groups are supplied to the bins. As the conveyor passes through the first bin, it passes under the oranges therein and picks them up and carries them along. When the conveyor with the moving oranges reaches the discharge opening, it carries out only the number of oranges which can be carried through the opening. By maintaining an excess of oranges at the opening, it is possible to supply a controlled quantity at this point.

The conveyor next passes to the second bin and passes under the oranges there. Startlingly, the conveyor loaded with oranges will pass through this second pile of oranges carrying substantially all of the oranges from the first group. The conveyor passes through the discharge from the second bin. This discharge is larger than the discharge from the first bin and the conveyor picks up oranges from the second bin. The number of oranges carried from the second bin is determined by the increase in size of the opening and to assure a constant blend an excess of oranges is maintained at this opening.

This carries on through the remaining bins with the openings becoming increasingly larger.

The belt is driven with a variable speed drive so that if there is any breakdown in the plant or if the total quantity of blended oranges is to be limited, the conveyor can be slowed down. The slowing down does not affect the ratio of oranges from the different bins carried by the conveyor. Thus it is possible to vary the total supply and maintain the ratio without need for adjustment other than of the variable drive.

The apparatus consists of a plurality of bins 1, 2, 3 and 4, which are disposed in series. The conveyor belt 5 passes through the bottom of these bins, which have sloping bottoms 6 which feed the oranges by gravity down to the conveyor.

Adjacent the conveyor in each bin are provided means which will hold back the oranges in the bin, which are indicated at 7, so that all of the oranges in the bin do not rest on the belt. These means consist of vertically-slidable stakes 8 which are slidably mounted between the wall 9 and the strip 10 and fit into grooves 11 at the bottom. By raising the desired number of stakes 8, it is possible to keep the desired excess of oranges present at the outlet gate while keeping a reserve supply available for automatic gravity feed.

These means may be omitted if desired, but they prevent overloading of the belt and contribute to the efficiency of the operation.

The belt is driven in the direction of the arrow in Fig. 1 by a variable speed drive 12 which is conventional and is not shown in detail.

Each of the bins is provided with a restricted outlet opening 13 which is substantially the width of the belt and extends vertically upward above the belt. Each opening 13 is provided with a vertically-adjustable gate 14 which may be held in adjusted position by a pin 15 fitting in holes 16 in the gate and in a hole 17 in the wall of the bin. Suitable guiding slides 18 are provided for the gate.

When the device is in use the openings starting with the discharge opening from bin 1 increase in size progressively so that the belt will be laden with the desired quantity of oranges in bin 1. It will then pick up additional oranges as it passes through bin 2 and so on until the entire blend of oranges is discharged from the final bin 4.

Any desired number of bins may be employed.

In use as above described, oranges of different groups are placed in different bins. The gates 14 are opened to the desired amount and the stakes 8 are adjusted to assure a supply of oranges at each outlet 13 in excess of the number of oranges which can be carried through the gate by the conveyor.

When the device is in operation for given groups of oranges it is not necessary to make continual adjustments in the stakes 8, it being only necessary to have a sufficient number raised to feed the oranges down to the conveyor in at least the desired quantity.

As shown in Fig. 3, an excess of oranges will collect back of each gate 14. The conveyor will carry the oranges along from the first bin and substantially all of these oranges will go through to the final discharge point.

The conveyor picks up additional oranges in each bin and the amount of oranges passing through to the next bin is controlled by the position of the gate for the discharge of the particular bin.

The invention has been described in connection with oranges, although wherever reference is made to oranges, it will be understood that it is equally applicable to other citrus fruits, such as lemons, grapefruit or tangerines, or indeed to other fruits or objects of a similar shape.

A preferred form of the invention has been described. However, it will be apparent to those skilled in the art that other forms of the invention can be employed and there is no intention by describing the preferred form of the invention to limit the invention to the particular form shown.

I claim:

1. Apparatus for continuously blending oranges or the like from different groups to provide a blend of substantially constant ratio of oranges from different groups in a substantially continuous flow comprising the combination of a first enclosure adapted to receive oranges from a first group and having walls and a second enclosure adapted to receive oranges from a second group and having walls, a horizontal belt conveyor disposed in the bottoms of said enclosures and positioned to underlie oranges in said enclosures and adapted to carry oranges and means for moving said belt through said enclosures from said first enclosure to said second enclosure and beyond said second enclosure, a first limited discharge aperture in a wall of said first enclosure disposed contiguous to and directly above said belt and of a height less than the height of said wall, a second discharge opening in a wall of said second enclosure disposed contiguous to and directly above said belt and of a height less than the height of said wall of said second enclosure, but greater than the height of said first discharge opening but of the same width.

2. Apparatus for continuously blending oranges or the like from different groups to provide a blend of substantially constant ratio of oranges from different groups in a substantially continuous flow, comprising the combination of a first enclosure adapted to receive oranges from a first group and having walls, and a second enclosure adapted to receive oranges from a second group and having walls, a horizontal belt conveyor disposed in the bottoms of said enclosures and positioned to underlie oranges in said enclosures and adapted to carry oranges, and variable speed means for moving said belt through said enclosures from said first enclosure to said second enclosure and beyond said second enclosure, a first limited discharge aperture in a wall of said first enclosure disposed contiguous to and directly above said belt and of a height less than the height of said wall, a second discharge opening in a wall of said second enclosure disposed contiguous to and directly above said belt and of a height less than the height of said wall of said second enclosure, but greater than the height of said first discharge opening but of the same width.

3. Apparatus for continuously blending oranges or the like from different groups to provide a blend of substantially constant ratio of oranges from different groups in a substantially continuous flow comprising the combination of a first enclosure adapted to receive oranges from a first group and having walls, and a second enclosure adapted to receive oranges from a second group and having walls, a horizontal belt conveyor disposed in the bottoms of said enclosures and positioned to underlie oranges in said enclosures and adapted to carry oranges and means for moving said belt through said enclosures from said first enclosure to said second enclosure and beyond said second enclosure, a first limited discharge aperture in a wall of said first enclosure disposed contiguous to and directly above said belt and of a height less than the height of said wall, means to vary the height of said opening, a second discharge opening in a wall of said second enclosure disposed contiguous to and directly above said belt and of a height less than the height of said wall of said second enclosure, and of the same width as said first discharge opening, and means to vary the height of said second opening.

References Cited in the file of this patent

UNITED STATES PATENTS

| | | |
|---|---|---|
| 1,103,333 | Weeks | July 14, 1914 |
| 1,215,739 | Stehli | Feb. 13, 1917 |
| 1,820,521 | Allen | Aug. 25, 1931 |
| 2,593,610 | Roberts | Apr. 22, 1952 |

FOREIGN PATENTS

| | | |
|---|---|---|
| 34,219 | Netherlands | Dec. 15, 1934 |